May 9, 1933.    C. H. EVERETT    1,907,766
STORAGE BATTERY
Filed Sept. 3, 1927
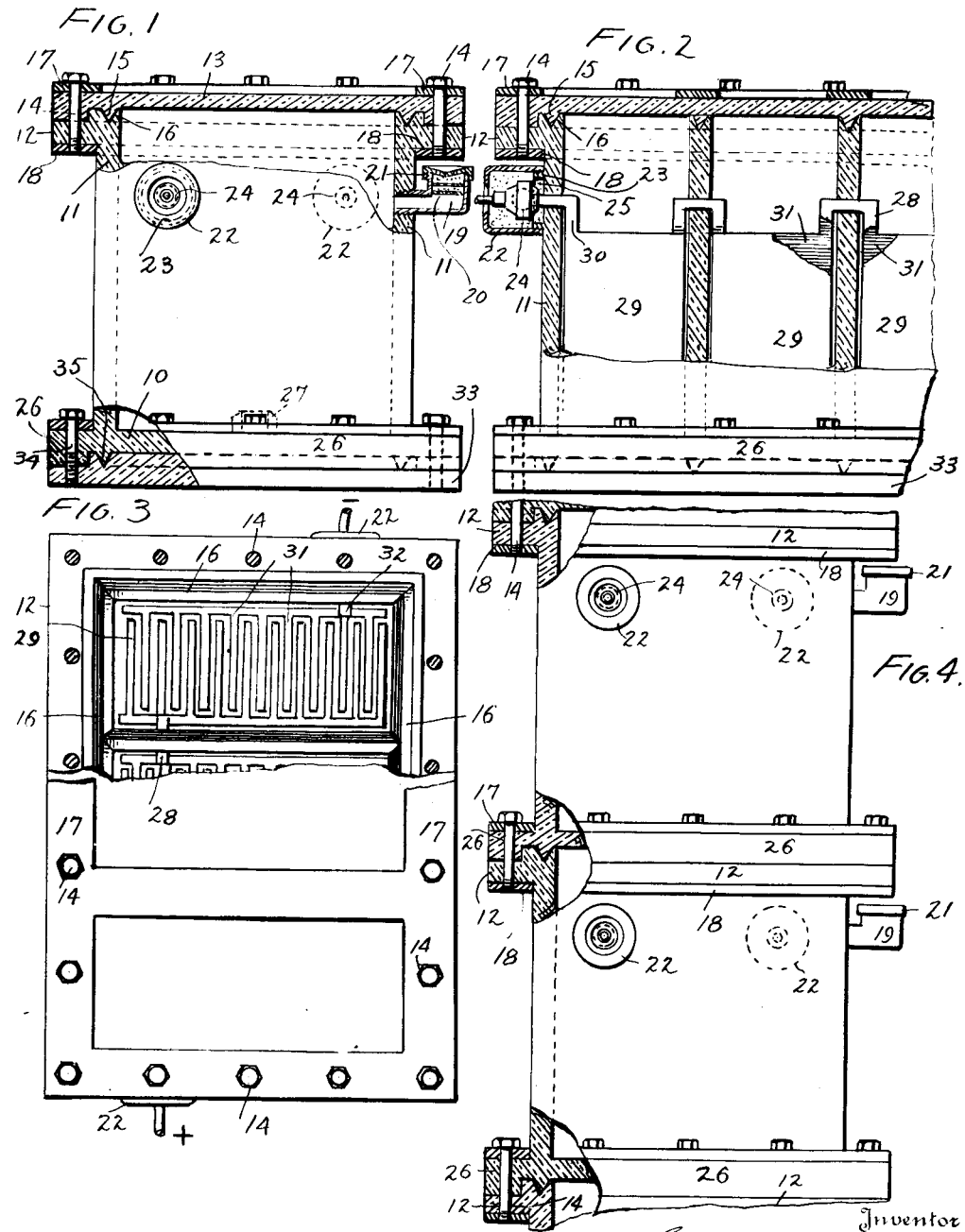

Patented May 9, 1933

1,907,766

UNITED STATES PATENT OFFICE

CLAUD HAROLD EVERETT, OF LANCASTER GATE, LONDON, ENGLAND, ASSIGNOR OF ONE-HALF TO GEORGE R. CARR, OF CHICAGO, ILLINOIS

STORAGE BATTERY

Application filed September 3, 1927. Serial No. 217,501.

It is of high importance that storage batteries be proof against leakage of solution or electrolyte, especially since they are so widely used under conditions which shake or vibrate them violently, and conditions under which they are tilted or even inverted, as in airplane use. Not only must unavoidable openings or joints be leak-proof, but it must be possible to readily open or remove the parts which form joints for inspection, cleaning, renewal of plates and separators, etc., so that even a layman may do that and so that when the parts are replaced or recombined, the joints may again be leak-proof. And not only is it desirable or important to secure leak-proof conditions, and by means that require no greater skill than laymen possess, but cost is an important consideration. The accepted practice in forming the joints between battery jars and their tops is the use of some sealing compound which requires the application of heat for melting it when the joint is to be opened, or gaskets of rubber and lead. In the case of sealing compounds which require melting, not only is the operation troublesome, but it results in breakage of the tops and jars. Soft rubber gaskets or washers deteriorate from the action of the acid solution of the battery and lead gaskets or washers become sulphated and elongated, and thus packings of these materials lose their elasticity or yieldability which is essential to efficient sealing the result being that the battery jars leak the acid solution at joints that exist necessarily adjacent to terminals, vents, and where the top and jar abut or come together. Sealing compounds crack and loosen when excessive vibration and sudden and more or less extreme changes of temperature occur, with the result that the acid solution creeps or oozes out from the jar, and leakage from whatever cause, results in corrosion of terminals, rotting of wood battery boxes or cases, and leakage of current, and grounds or short circuiting because of the moist or wet conditions of the exterior of the battery. By my invention I supply a construction which remedies the conditions above set forth and a construction which in other respects is most advantageous, as will be hereinafter more fully set forth.

My invention consists in whatever is described by or is included within the terms or scope of the appended claim.

In the drawing:

Figs. 1 and 2 are partly elevations and vertical sections in planes at right angles with one another of a battery embodying my invention;

Fig. 3 is a top plan view with parts of the top broken away;

Fig. 4 is an end view with parts in section illustrating a tiered arrangement.

In what I consider a most satisfactory embodiment of my invention, preferably, though not necessarily, a unit consists of more than one jar as that secures economy of manufacture, my unit enables the ready building up of a battery by assembling a number of units, so that one starting, for example, with one unit may thereafter enlarge his battery by the addition of similar units.

Describing in detail what is shown in the drawing, the jar has a bottom, 10, vertical side walls, 11 (the same side wall between adjoining jars or cells serving for the two when the unit consists of more than one jar). At the top is an outwardly projecting integral flange, 12, and when a single unit is employed, or with the tiered arrangement, shown in Fig. 4, there is a top or cover, 13, having horizontal dimensions to extend over the marginal flanges, 12, aligning vertical holes being provided in top and flanges for the passage of securing bolts, 14, by which the top is tightly clamped at its under surface against the top surface of the jar walls, the opposing surface having interengaging complementary ribs and grooves, as for example, a rib, 15, on the underside of the top that is V-shape in cross section and a matching groove, 16, in the top of the side walls. Of course, the configuration or form of rib and groove may vary consistent with the production of a joint that will be leak-proof. The rib and groove arrangement extends around all four sides of the jar, whether a single jar, or each one of a unit that includes more than one. The bolts, 14, are of a non-corrosive metal, a lead alloy for example, and there are non-corrosive metal plates which may also be of lead alloy, each of rectangular open or frame-like form, as best shown in Fig. 3. One such plate, 17, is between the heads of the bolts, and the upper side of the top or cover, and the other such plate, 18, is situated beneath the jar flange and has a threaded hole into which the bolt screws. It will be evident that the jar or cover and top of the jar are clamped or held together with sufficient pressure to provide the important leak-proof joint between them, and that they are held securely together against any possibility of accidental movement which would result in displacement and opening of the joint. I employ no packing material whatever between the joints, either in the form of a sealing compound, or gaskets or washers, but secure the leak-proof joint wholly from the contact of abutting surfaces of top or cover and jar.

A vent is provided for escape of gases generated in the cell. Said vent includes a cup, 19, with a hollow neck screwed in a hole in an external wall of each jar, and within the cup is a loose packing material, such as glass wool, divided into several layers or strata by perforated plates, 20, and the cup has a cover, 21, to confine the loose material and provided with small holes for the outward passage of gases flowing outward through the vent. But while gas is free to escape, it is impossible for the solution to pass therethrough, even when the battery is tilted or inverted, and thus, the vent construction contributes to the leak-proof characteristic of the jar.

And the terminal connectors that are provided are of a construction which will prevent leakage of solution, each as shown comprising a cup or enclosing shell, 22, screwed to an externally threaded lug, 23, on the jar wall within which shell is a ball-form connector, 24, surrounded by an acid-proof filling, 25, that completely fills the space between the same and the interior of the shell and thus escape or leakage of solution is prevented.

When, as shown in Fig. 4, the units are placed, one above another or in a tiered arrangement, the bottom of one unit rests upon the top of a lower unit, and such bottom is provided with the joint-making rib or projection which enters the groove in the top of the unit beneath and the bottom has an outwardly projecting flange, 26, for the passage of attaching bolts and for application of the non-corrosive metal clamping plates.

Jars or cells whether in units that are a single jar or cell, or in units that are of block-form which comprise a plurality of jars or cells may be inexpensively manufactured by being molded, stamped, cast or otherwise economically formed with bottom and walls in one integral piece. On the bottom may be integrally formed an upwardly projecting foot, 27, for positioning and holding rigidly in place, the plates or grids of the battery.

As shown in Figs. 2 and 3 when a unit comprises integral side by side jars, the plates of the same kind or polarity in adjoining cells are electrically connected by connector terminals, 28, that are molded in and extend through the inner vertical cell walls, and the external ball-form connector for positive plates, 29, is connected to the plates in the end jar by a terminal 30, which extends through and is molded in the adjacent outside cell wall and the external ball-form connector, for negative plates is connected to plates in the adjacent end jar by a connector, 32, that likewise is molded in the adjacent wall.

On account of the tiered arrangement the vents and the external ball-connectors are, as shown in the drawing, applied to the side walls, but in cases where no tiered arrangement is contemplated the vent and ball connectors for a jar may be applied to the top or cover, 13.

If desired, as shown in Figs. 1 and 2, there may be a bottom block, 33, held in place or clamped by bolts, 34, to cover and protect the joint-making rib, 35, but if such bottom is omitted damaging contact of the apex of the ridge with a surface upon which the battery might stand would be prevented by a marginal downward projection, 36, from the bottom flange, 26, the projection being of a depth not to prevent efficient sealing contact of the sides of V-rib and groove.

By my invention I produce an acid-leak-proof high and low tension battery of light weight, and of low cost, whose interior can be readily gotten at for inspection, cleaning, and repairs, even by an amateur or layman, and can by him be restored to the desired leak-proof condition, and is thus free from the objections to and is superior to the battery on the market today for radio use, the battery on the market today having either a sealed top for the cell with the objections thereto that have heretofore been pointed out, or is open to the atmosphere at the top which is a dangerous construction, especially where children or careless persons are about, as in the home, and which may be the occasion of damage to rugs, carpets, and other furnishings by being tilted or up-set, so that the destructive acid-solution is spilled out.

Besides the tiered arrangement, groups of units may be placed side by side and so when placed an air space exists between adjacent units sufficient to prevent condensation of moisture from the atmosphere on the exterior walls which with high tension currents or high voltage is objectionable because of leakage of current which results and the danger of shocks to persons touching the battery.

What I claim is:

A storage battery comprising a plurality of connected superimposed jars, the body of one jar forming a cover for a lower jar, and a cover for the topmost jar, all said jars having marginal flanges at top and bottom which provide means for connecting adjacent jars, interengaging ribs and grooves on abutting surfaces of jars, non-corrosive plates upon upper and lower sides of said flanges and bolts that pass through and connect plates and portions of flanges lying between them.

In testimony whereof I have signed my name to this specification.

CLAUD HAROLD EVERETT.